United States Patent
Denteneer et al.

(10) Patent No.: US 6,563,871 B1
(45) Date of Patent: May 13, 2003

(54) DEVICE AND METHOD FOR ADVANCED BAYESIAN KALMAN TIME ESTIMATION

(75) Inventors: Theodorus Jacobus Johannes Denteneer, Eindhoven (NL); Antonie Dijkhof, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 346 days.

(21) Appl. No.: 09/713,876

(22) Filed: Nov. 16, 2000

(30) Foreign Application Priority Data

Nov. 26, 1999 (EP) .............................. 99203990

(51) Int. Cl.$^7$ ................................. H04N 7/56
(52) U.S. Cl. ..................... 375/240.01; 375/240.28; 714/20
(58) Field of Search ................. 375/240.01, 240.28; 714/20; H04N 7/56

(56) References Cited

U.S. PATENT DOCUMENTS 5,778,387 A * 7/1998 Wilkerson et al. ............ 714/20
5,884,249 A * 3/1999 Namba et al. ................ 704/9

\* cited by examiner

Primary Examiner—Howard Britton
(74) Attorney, Agent, or Firm—Laurie E. Gathman

(57) ABSTRACT

A method and device are disclosed for calculating estimated time stamps $ì_t$ in video distribution apparatus, MPEG-2 program encoders, multiplexers, splicers. True times $Y_t$ of a data packet number t having the linear form:

$$Y_t = Y_{t-1} + \beta_t,$$

$$\beta_t = \beta_{t-1} + \eta_t,$$

with $\eta_t$ being a small perturbation relative to the linear relation between time and packet number. The true times of data packet number t are observed as: $o_t = Y_t + \epsilon_t$, where $\epsilon_t$ is an observational error. The estimated time stamps are produced according to: $ì_t = ì_{t-1} + \beta_t$ and such that the value of $\beta_t$ is made dependent on the exceeding by $\#o_t - ì_{t-1} - \beta_{t-1} \#$ of $\max[\epsilon_t]$. The results are accurate and smooth estimated time stamps.

5 Claims, 1 Drawing Sheet

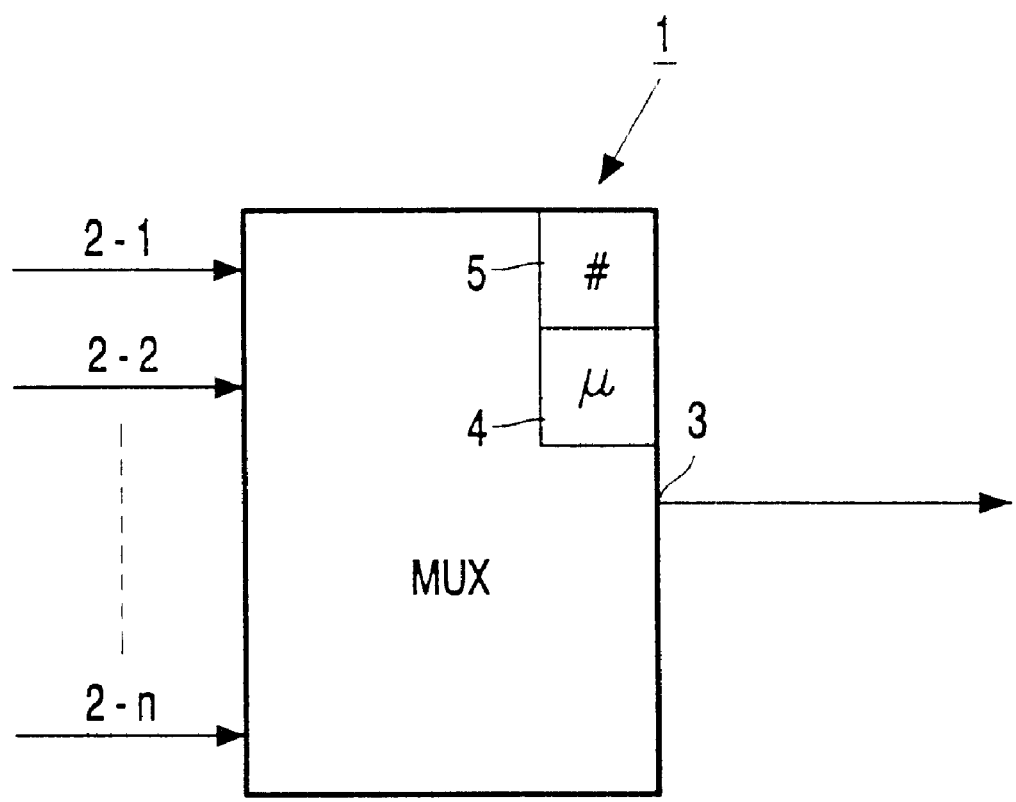

DEVICE AND METHOD FOR ADVANCED BAYESIAN KALMAN TIME ESTIMATION

BACKGROUND OF THE INVENTION

The present invention relates to a device for calculating estimated time stamps $\hat{\imath}_t$, the device comprising processor means provided with an output, and with an input for receiving true times $Y_t$ of a data packet number t having the linear form:

$$Y_t = Y_{t-1} + \beta_t,$$

$$\beta_t = \beta_{t-1} + \eta_t,$$

with $\eta_t$ being a small perturbation relative to the linear relation between time and packet number, whereby the processor means are arranged:

to observe the true time of data packet number t as:

$$o_t = Y_t + \epsilon_t,$$

where $\epsilon_t$ is an observational error, and to produce at its output the estimated time stamps according to:

$$\hat{\imath}_t = \hat{\imath}_{t-1} + \beta_t.$$

The present invention also relates to a method set out in the preamble of claim 5.

Such a device and method are known from "Bayesian forecasting and dynamic models", by West, M. and J. Harrison, in particular section 7.3, Springer, 1998. Described therein is the Bayesian Kalman model, which is a dynamic linear model for predicting time stamps $\hat{\imath}_t$, based on true times $Y_t$ of an input data packet number t. This technique is applied in Digital Videocommunication Systems used in the distribution and combination of for example video signals for multiplexing, re-multiplexing and de-multiplexing in particular MPEG (=Moving Picture Encoded Group) transport streams. Usually the relation between time and packet number is linear in e.g. MPEG streams. In practise the specifications of these streams allow for small deviations from linearity, whereby the coefficients of the linear relation may vary slowly in time. The true times $Y_t$ of data packet number t can be described in the linear form as:

$$Y_t = Y_{t-1} + \beta_t,$$

$$\beta_t = \beta_{t-1} + \eta_t,$$

with $\eta_t$ being a small perturbation relative to the linear relation between time and packet number, that holds in the vicinity of packet t−1. The true time of data packet number t is observed as:

$$o_t = Y_t + \epsilon_t,$$

where $\epsilon_t$ is an observational error. $\epsilon_t$ and $\eta_t$ are stochastic variables having a normal distribution in the standard theoretical development of the model. Now based on prior knowledge about $(\beta_0, Y_0)$, an explicit Bayesian analysis can be performed leading to a posterior distribution of $(\beta_t, Y_t)$ after observing $o_t$. This leads to the known Bayesian Kalman filter as a means for revealing $\hat{\imath}_t$ as an estimate for the true time $Y_t$, given the observed time $(o_1, \ldots, o_t)$ of packet t. West and the Harringtons give a full formal derivation thereof in section 7.3. Two Bayesian Kalman, to be referred to as BK, estimates are proposed. The ordinary BK is optimal with respect to a tracking error $\delta^{(t)}$, defined by: #$Y_t - \hat{\imath}_t$#<$\delta^{(t)}$, whereas a smoothed BK estimate is optimal with respect to smoothness, defined by: #$\hat{\imath}_t - 2\hat{\imath}_{t-1} + \hat{\imath}_{t-2}$#<$\delta^{(s)}$.

It is a disadvantage of the standard Bayesian Kalman device and method that, either tracking or smoothing constraints can only be complied with.

SUMMARY OF THE INVENTION

Therefore it is an object of the present invention to provide an improved Bayesian Kalman device and method, which can simultaneously comply with both the above tracking constraint and the above smoothing constraint.

Thereto the device according to the present invention is characterised in that the computation by the processing means is such that the value of $\beta_t$ is made dependent on the exceeding by #$o_t - \hat{\imath}_{t-1} - \beta_{t-1}$ # of max[$\epsilon_t$].

It is an advantage of the device according to the invention that the values of $\epsilon_t$ are made conditional on the difference between the observed true time $o_t$ and the estimated time stamps $\hat{\imath}_t$. If tracking becomes a problem the maximum value of $\epsilon_t$ (which is max[$\epsilon_t$]), is exceeded by that difference and then $\beta_t$ can be chosen to have a different value, such that tracking will no longer be a problem. Thus the result is a sequence of time stamps, which is both smooth and accurate, which is especially but not exclusively important in an SW-MUX (SoftWare encoding and MUltipleXing), Token-Mux or DTS (Decode Time Stamp) environment, where observed time stamps in data, samples and/or packets can be very noisy or are provided with jitter.

As time stamps are very important in devices and apparatus that time, multiplex, demultiplex or remultiplex program components, such as program encoders, splicers etcetera, an improved timing accuracy also improves the video image quality and synchronisation capabilities. It also shortens the acquisition time in transport stream equipment, such as with MPEG-2 transport streams.

Another embodiment of the device according to the invention is characterised in that the computation by the processing means is such that:

$\beta_t$ equals $\beta_t^{(i)}$ if #$o_t - \hat{\imath}_{t-1} - \beta_{t-1}$ #$\leq$max[$\epsilon_t$], else $\beta_t$ equals $\beta_{t-1}$+sign($o_t - \hat{\imath}_{t-1} - \beta_{t-1}$)max[$\eta_t$], with $\beta_t^{(i)} = \beta_{t-1} + rA$, $A = (o_t - \hat{\imath}_{t-1} - \beta_{t-1})/\text{var}[o_t]$, r being the prior—i.e before observing $o_t$—correlation between $\beta_t$ and $Y_t$; and that:

$$\hat{\imath}_t = \hat{\imath}_{t-1} + \beta_{t-1} + A^*\text{var}[Y_t].$$

Advantageously in case of tracking problems the values of $\beta_t$ are updated at the maximum rate that is allowed by the specifications, whereby this boosted estimate replaces the smooth Bayesian Kalman estimate of $\beta_t$ in the Kalman recursion relations. The filter thus devised approaches to some extend the known Bayesian Kalman filter device as a special case, which may be achieved by setting max[$\epsilon_t$]=∞. Advantageously the device according to the invention has three degrees of freedom: max[$\epsilon_t$] which usually is the upper bound to the magnitude of the noise, max[$\eta_t$] which is the upper bound to the maximum nonlinearity that is allowed, and var[$\epsilon_t$] or $\sigma^2[\epsilon_t]$ being the variance of the statistical noise distribution.

One embodiment of the device according to the invention is characterised in that the processing means are programmable processing means, which are programmed to perform said computations. It is an advantage of the device according to the invention that no essential hardware is necessary and that the computations can be done by an ordinary computer, such as a PC, whereon the advanced BK filter can be software implemented.

Easy and flexible programming is realised in a further embodiment of the device according to the invention, which is characterised in that the computations are programmed in the C programming language.

Similarly the method according to the present invention has the characterising features outlined in claim 5, and the advantages set out above.

BRIEF DESCRIPTION OF THE DRAWING

At present the device and method according to the invention will be elucidated further together with their additional advantages, while reference is being made to the appended FIGURE. The FIGURE shows an simplified embodiment of the device according to the invention.

DESCRIPTION OF THE PREFERRED EMBODIMENTS

The FIGURE shows a system or device 1 having one or more inputs 2-1, . . . , 2-n, and an output 3. The inputs 2 can carry time signals, such as video signals, in particular MPEG like video signals which are set to a process of extracting time information from the input signals by means of a processor 4, such as a microprocessor, which is included in the device 1. The time information in the signals represent true moments in time, referred to as $Y_t$, of a data packet number t. The consecutive true times have the linear form:

$$Y_t = Y_{t-1} + \beta_t,$$

$$\beta_t = \beta_{t-1} + \eta_t,$$

with $\eta_t$ being a small perturbation relative to the linear relation between time and packet number. The processor means 4 are arranged to observe the true time of data packet number t as $o_t = Y_t + \epsilon_t$, where $\epsilon_t$ is an observational error. Finally the device 1 produces in case it functions as a multiplexer one output signal, containing the estimated time stamps according to:

$$\hat{\imath}_t = \hat{\imath}_{t-1} + \beta_{t-1} + A * \text{var}[Y_t].$$

These estimated time stamps have to be accurate and smooth at all times. Generally there are two main constraints which are posed on the estimate $\hat{\imath}_t$:

the tracking constraint: $\#Y_{t-1}\hat{\imath}_t\# < \delta^{(t)}$  (1)

and the smoothness constraint: $\#\hat{\imath}_t - 2\hat{\imath}_{t-1} + \hat{\imath}_{t-2}\# < \delta^{(s)}$.  (2)

Equation (1) expresses that the difference between the true times and the estimated times should not exceed $\delta^{(t)}$, and equation (2) expresses that the first derivative of the consecutive estimated times should not exceed $\delta^{(s)}$. In order to be able to comply with both requirements it is proposed that the estimated time stamps are calculated such that the value of $\beta_t$ is made dependent on the exceeding by $\#o_t - \hat{\imath}_{t-1} - \beta_{t-1}\#$ of max$[\epsilon_t]$. This provides additional flexibility to comply with the above mentioned tracking constraints. In particular the computation by the processing means is such that:

$\beta_t$ equals $\beta_t^{(i)}$ if $\#o_t - \hat{\imath}_{t-1} - \beta_{t-1}\# \leq \max[\epsilon_t]$, else $\beta_t$ equals $\beta_{t-1} + \text{sign}(o_t - \hat{\imath}_{t-1} - \beta_{t-1}) \max[\eta_t]$, with $\beta_t^{(i)} = \beta_{t-1} + rA$, $A = (o_t - \hat{\imath}_{t-1} - \beta_{t-1})/\text{var}[o_t]$, r being the prior—i.e. before observing $o_t$—correlation between $\beta_t$ and $Y_t$; and that:

$$\hat{\imath}_t = \hat{\imath}_{t-1} + \beta_{t-1} + A * \text{var}[Y_t].$$

This additionally provides for compliance with the smoothness constraint, as in the case of no tracking problem the known Bayesian Kalman model is followed. This is described in "Bayesian forecasting and dynamic models", by West, M. and J. Harrison, in particular section 7.3, Springer, 1998, which is incorporated herein by reference thereto. The variety of scalar matrix quantities in the correlation r and in the expression for the variance var can be taken from the known Bayesian Kalman model as described in the above article. They allow for very fast calculation of these quantities.

The processing means may and will generally be programmable processing means, stored in a memory 5 included in the device 1, which are programmed to perform said computations. So no hardware modules are necessary any more. The computations may be programmed in any programming language, but the C programming language is preferred because of its general acceptance.

What is claimed is:

1. A device for calculating estimated time stamps $\hat{\imath}_t$, the device comprising processor means provided with an output, and with an input for receiving true times $Y_t$ of a data packet number t having the linear form:

$$Y_t = Y_{t-1} + \beta_t,$$

$$\beta_t = \beta_{t-1} + \eta_t,$$

with $\eta_t$ being a small perturbation relative to the linear relation between time and packet number, whereby the processor means are arranged:

to observe the true time of data packet number t as:

$$o_t = Y_t + \epsilon_t,$$

where $\epsilon_t$ is an observational error, and to produce at its output the estimated time stamps according to:

$$\hat{\imath}_t = \hat{\imath}_{t-1} + \beta_t,$$

characterised in that the computation by the processing means is such that the value of $\beta_t$ is made dependent on the exceeding by $\#o_t - \hat{\imath}_{t-1} - \beta_{t-1}$ # of max$[\epsilon]$.

2. The device according to claim 1, characterised in that the computation by the processing means is such that:

$\beta_t$ equals $\beta_t^{(i)}$ if $\#o_t - \hat{\imath}_{t-1} - \beta_{t-1}$ # $\leq \max[\epsilon_t]$, else $\beta_t$ equals $\beta_{t-1} + \text{sign}(o_t - \hat{\imath}_{t-1} - \beta_{t-1}) \max[\eta_t]$, with $\beta_t^{(i)} = \beta_{t-1} + rA$, $A = (o_t - \hat{\imath}_{t-1} - \beta_{t-1})/\text{var}[o_t]$, r being the prior correlation between $\beta_t$ and $Y_t$; and that:

$$\hat{\imath}_t = \hat{\imath}_{t-1} + \beta_{t-1} + A * \text{var}[Y_t].$$

3. Device according to claim 1, characterised in that the processing means are programmable processing means, which are programmed to perform said computations.

4. Device according to claim 3, characterised in that the computations are programmed in the C programming language.

5. A method wherein estimated time stamps $\hat{\imath}_t$ are being calculated, and where true times $Y_t$ of a data packet number t which are being processed have the linear form:

$$Y_t = Y_{t-1} + \beta_t,$$

$$\beta_t = \beta_{t-1} + \eta_t,$$

with $\eta_t$ being a small perturbation relative to the linear relation between time and packet number, whereby the true time of data packet number t is observed as:

$$o_t = Y_t + \epsilon_t,$$

where $\epsilon_t$ is an observational error, and where the estimated time stamps are being produced according to:

$$\hat{\imath}_t = \hat{\imath}_{t-1} + \beta_t$$

characterised in that the processing taken place such that: $\beta_t$ equals $\beta_t^{(i)}$ if $\#o_t - \hat{\imath}_{t-1} - \beta_{t-1}\# \leq \max[\epsilon_t]$, else $\beta_t$ equals $\beta_{t-1} + \text{sign}(o_t - \hat{\imath}_{t-1} - \beta_{t-1})\max[\eta_t]$, with $$\beta_t^{(i)} = \beta_{t-1} + rA,$$

$$A = (o_t - \hat{\imath}_{t-1} - \beta_{t-1})/\text{var}[o_t],$$

r being the prior correlation between $\beta_t$ and $Y_t$; and that:

$$\hat{\imath}_t = \hat{\imath}_{t-1} + \beta_{t-1} + A^*\text{var}[Y_t].$$

* * * * *